US012371181B2

(12) United States Patent
Pautis et al.

(10) Patent No.: US 12,371,181 B2
(45) Date of Patent: Jul. 29, 2025

(54) AIRCRAFT HAVING AN ENGINE PYLON WITH A MOBILE COWL

(71) Applicant: Airbus Operations SAS, Toulouse (FR)

(72) Inventors: Olivier Pautis, Toulouse (FR); Paolo Messina, Toulouse (FR); Jonathan Blanc, Toulouse (FR); Thomas Robiglio, Toulouse (FR); Thomas Firmignac, Labege (FR)

(73) Assignee: Airbus Operations SAS, Toulouse (FR)

( * ) Notice: Subject to any disclaimer, the term of this patent is extended or adjusted under 35 U.S.C. 154(b) by 61 days.

(21) Appl. No.: 18/541,513

(22) Filed: Dec. 15, 2023

(65) Prior Publication Data
US 2024/0199218 A1 Jun. 20, 2024

(30) Foreign Application Priority Data

Dec. 19, 2022 (FR) ..................................... 2213828

(51) Int. Cl.
*B64D 29/06* (2006.01)
*B64D 29/02* (2006.01)

(52) U.S. Cl.
CPC ............. *B64D 29/06* (2013.01); *B64D 29/02* (2013.01)

(58) Field of Classification Search
CPC ........ B64D 29/06; B64D 29/02; B64D 29/08; B64D 2033/0206; B64C 7/02
See application file for complete search history.

(56) References Cited

U.S. PATENT DOCUMENTS

| 4,428,609 A | 1/1984 | Baehr |
| 4,524,485 A | 6/1985 | Harris |
| 2016/0221682 A1 | 8/2016 | Pautis et al. |
| 2020/0070992 A1 | 3/2020 | Theron |
| 2022/0297845 A1 | 9/2022 | Pautis et al. |
| 2022/0315232 A1 | 10/2022 | Pautis et al. |

FOREIGN PATENT DOCUMENTS

| EP | 0126840 A1 | 12/1984 |
| FR | 3120854 A1 | 9/2022 |
| FR | 3121428 A1 | 10/2022 |

OTHER PUBLICATIONS

French Search Report for corresponding French Patent Application No. 2213828 dated Jul. 19, 2023; priority document.

*Primary Examiner* — Timothy D Collins
*Assistant Examiner* — Terri L Filosi
(74) *Attorney, Agent, or Firm* — Greer, Burns & Crain, Ltd.

(57) ABSTRACT

An aircraft having a fixed structure, an engine pylon, and a cowling system, a slider bearing a rear cowl and able to move in translation from an advanced position to a retracted position, a displacement system having, on either side of a median plane of the engine pylon, a guide as one with the fixed structure, a sliding element as one with the slider and sliding along each guide disposed on the same side, and a support as one with the fixed structure and having a blade parallel to the translation direction and on which a surface parallel to the translation direction of the slider rests. The presence of the mobile cowl ensures, inter alia, easy access to the inside of the engine pylon and to the systems that are housed therein.

5 Claims, 6 Drawing Sheets

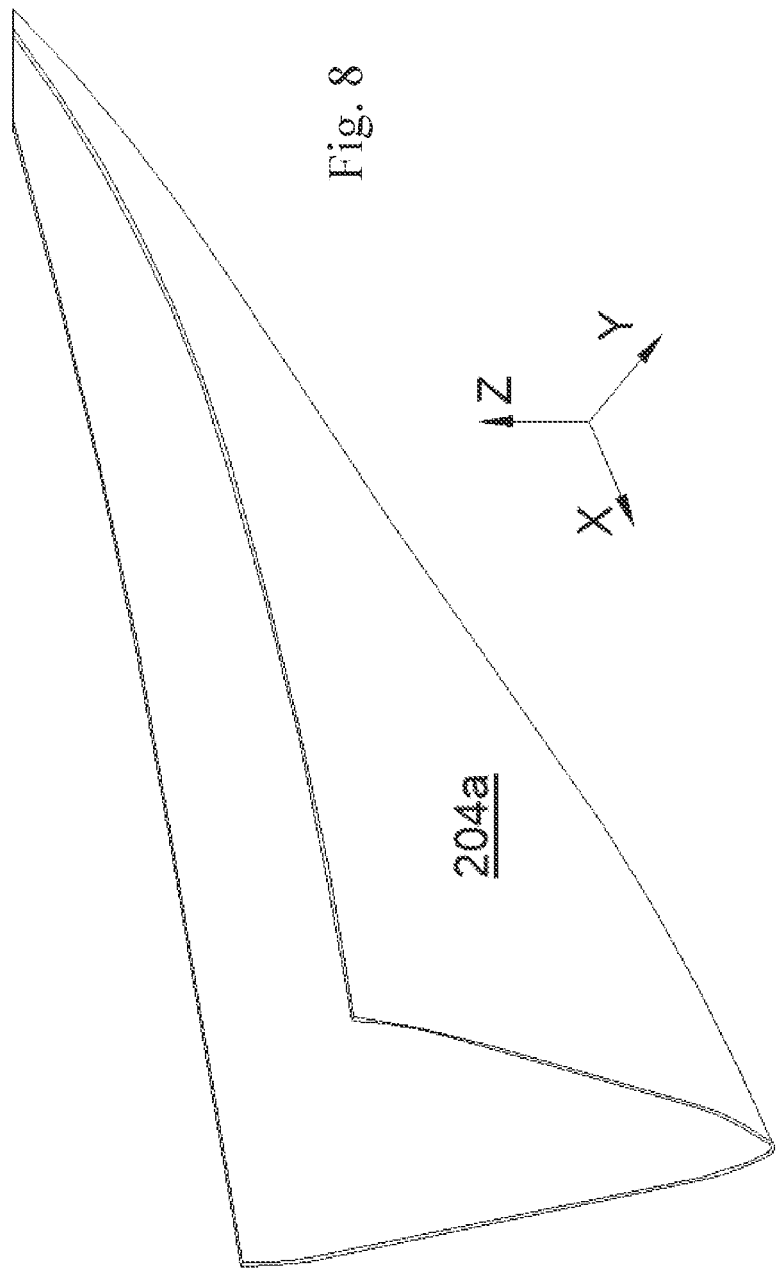

AIRCRAFT HAVING AN ENGINE PYLON WITH A MOBILE COWL

CROSS-REFERENCES TO RELATED APPLICATIONS

This application claims the benefit of the French patent application No. 2213828 filed on Dec. 19, 2022, the entire disclosures of which are incorporated herein by way of reference.

FIELD OF THE INVENTION

The present invention relates to an aircraft having an engine pylon with a mobile cowl allowing access to the inside of the engine pylon.

BACKGROUND OF THE INVENTION

An aircraft conventionally has an engine, for example a jet engine, which is fastened beneath a wing of the aircraft using an engine pylon. The engine pylon is constituted of a rigid structure that is fastened both to a structure of the wing and to a structure of the engine. The engine pylon allows the transmission of the forces generated by the engine to the structure of the wing, when the engine is running. The engine pylon also allows systems to pass between the wing and the engine, such as, for example, the electrical system, the hydraulic system, pneumatic system, etc.

In order to limit the drag of the engine pylon, it is covered with a set of cowls. The cowls are positioned next to one another so as to create a surface that is as smooth as possible, and are fastened either to the structure of the engine pylon or to the structure of the wing of the airplane.

In order to access the inside of the engine pylon, removable hatches are provided on some of these cowls. The hatches are fastened by threaded fasteners or rivets and, after removal, a technician can access the inside of the engine pylon and thus perform maintenance on the elements that are present.

The fastening of the cowls requires the presence of a structure that is relatively rigid and therefore heavy. Furthermore, as a result of the manufacturing and assembly tolerances, a plurality of cowls cannot be juxtaposed next to one another without the appearance of spaces and discontinuities between these cowls. These spaces and discontinuities can cause disruption of the flow of the air and the occurrence of acoustic phenomena. Finally, the removal of the hatches does not allow easy access to the inside of the engine pylon and their presence makes it necessary to put in place local structural reinforcing elements.

SUMMARY OF THE INVENTION

An object of the present invention is thus to propose an aircraft having an engine pylon with a mobile cowl. Such a mobile cowl allows easy access to the engine pylon and to the systems that are included therein, in particular for maintenance and inspection tasks, and the structure supporting this mobile cowl is simplified with respect to a structure of the prior art. Furthermore, this mobile cowl can be made in one piece, which in turn reduces the disruption of the flow of the air and the occurrence of acoustic phenomena.

To this end, there is proposed an aircraft having a fixed structure, a wing, an engine and an engine pylon fastened between the wing and the engine, the engine pylon having a primary structure intended to fasten the engine and the wing to each other, and a cowling system having:
- a front set of cowls, wherein the cowls are fastened around the primary structure,
- a slider bearing a mobile rear cowl disposed in the continuation of and at the rear of the front set of cowls, wherein the slider is able to move in translation parallel to a translation direction from an advanced position, in which the mobile rear cowl is in the continuation of and at the rear of the front set of cowls, to a retracted position, in which the mobile rear cowl is moved away, towards the rear, from the front set of cowls,
- a displacement system arranged to move the slider and having, on either side of a median plane of the engine pylon, at least one guide as one with the fixed structure at a rear part of the mobile rear cowl in the closed (advanced) position, for each at least one guide, a sliding element as one with the slider and mounted so as to be able to slide along each guide disposed on the same side so as to realize a sliding connection, and, for each sliding element, a support as one with the fixed structure and having a blade parallel to the translation direction and on which a surface parallel to the translation direction of the slider rests, wherein each support is disposed at the front of the guides and generally in the middle of the sliding element when the slider is in the advanced position, and
- an immobilizing system alternately adopting a locked position in which it immobilizes the slider in the advanced position, and an unlocked position in which it does not immobilize the slider.

The presence of the mobile cowl and its displacement system ensures easy access to the inside of the engine pylon and to the systems that are housed therein and easy displacement of the mobile cowl.

Advantageously, each sliding element has a cylinder parallel to the translation direction of which the length is at least equal to the length of displacement of the slider, and each guide has a bore parallel to the translation direction in which the cylinder is mounted so as to be able to slide.

Advantageously, the fixed structure has a bottom front centering pin and the slider has a first housing in which the bottom front centering pin is housed when the slider arrives in the advanced position, wherein the first housing is disposed at the median plane and in the bottom part and at the front of the mobile rear cowl.

Advantageously, the slider has two top front centering pins disposed on either side of the median plane and in the top part and at the front of the mobile rear cowl, and the fixed structure has, for each top front centering pin, a second housing in which the top front centering pin is housed when the slider arrives in the advanced position.

Advantageously, the slider has two rear centering pins disposed on either side of the median plane and in the top part and near the guides in the advanced position, and the fixed structure has, for each rear centering pin, a third housing in which the rear centering pin is housed when the slider arrives in the advanced position.

BRIEF DESCRIPTION OF THE DRAWINGS

The abovementioned features of the invention, along with others, will become more clearly apparent upon reading the following description of one exemplary embodiment, the description being given with reference to the appended drawings, in which:

FIG. 8 is a perspective view of one embodiment of the mobile cowl of the engine pylon.

DETAILED DESCRIPTION OF THE PREFERRED EMBODIMENTS

Figure 1:
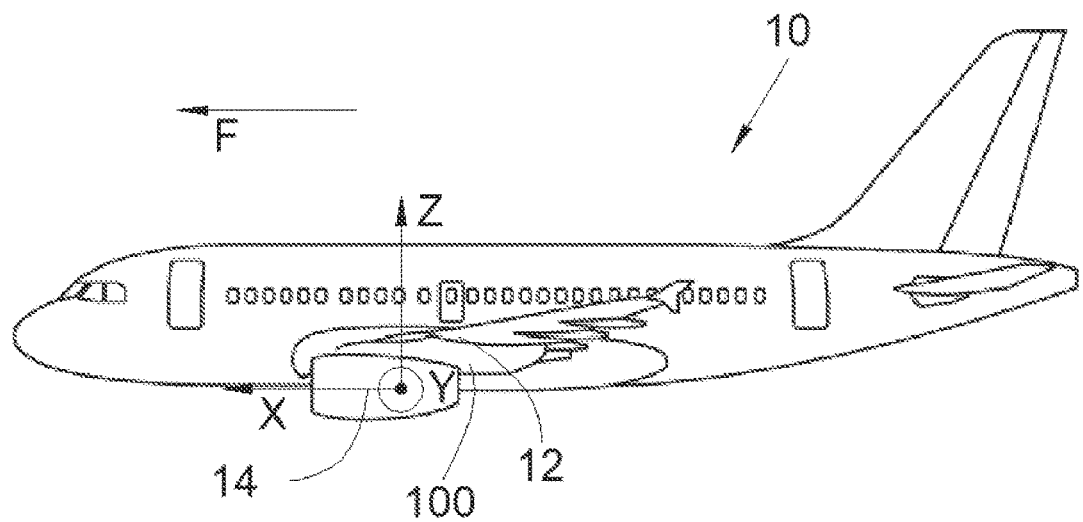
FIG. 1 is a side view of an aircraft according to the invention.

FIG. 1 shows an aircraft 10 that has an engine 14, for example a jet engine, and a wing 12 beneath which the engine 14 is fastened via an engine pylon 100. The aircraft 10 has a fixed structure 50 that can encompass the structure of the wing 12 and the structure of the engine 14.

In the following description, terms relating to a position are considered in relation to an aircraft 10 in a normal flight position, i.e., as shown in FIG. 1, and the "front" and "rear" positions are considered relative to the front and the rear of the engine 14 and relative to the direction of forward movement F of the aircraft 10 when the engine 14 is in operation.

In the following description, and by convention, the X direction is the longitudinal direction of the engine 14, which is parallel to the longitudinal axis of the jet engine, the Y direction is the transverse direction, which is horizontal when the aircraft 10 is on the ground, and the Z direction is the vertical direction, which is vertical when the aircraft 10 is on the ground, these three directions X, Y and Z being mutually orthogonal.

Figure 2:
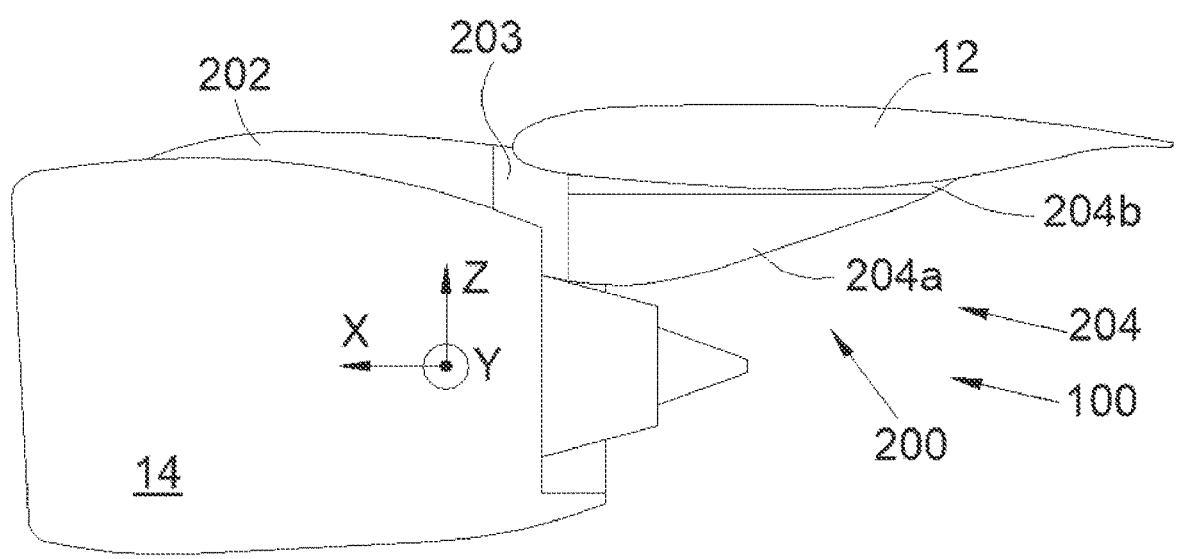
FIG. 2 is a side view of a propulsion assembly having an engine pylon according to the invention.

FIG. 2 shows the wing 12 and the engine 14 fastened to one another via the engine pylon 100 that has a front set of cowls 202, 203 and a rear cowl 204.

In the embodiment of the invention that is presented here, the rear cowl 204 is divided into a mobile rear cowl 204a in the bottom part and a fixed rear cowl 204b in the top part between the mobile rear cowl 204a and the wing 12. The fixed rear cowl 204b is as one with the pressure-side panel of the wing 12 and can be considered to form part of the wing 12.

In another embodiment of the invention (not shown), the rear cowl 204 is limited to the mobile rear cowl 204a that comes directly against the pressure-side panel of the wing 12.

In the embodiment of the invention that is presented here, the front set of cowls has a front cowl 202 and an intermediate cowl 203 disposed at the rear of the front cowl 202, but in another embodiment, the front cowl 202 and the intermediate cowl 203 can constitute just a single cowl.

The mobile rear cowl 204a is disposed at the rear of the front set of cowls 202, 203.

In this case, the mobile rear cowl 204a is disposed beneath the wing 12 and at the rear of the engine 14 and the front cowl 202 is disposed above the engine 14 and in front of the wing 12. The intermediate cowl 203 forms the junction between the front cowl 202 and the rear cowl 204.

Figure 3:
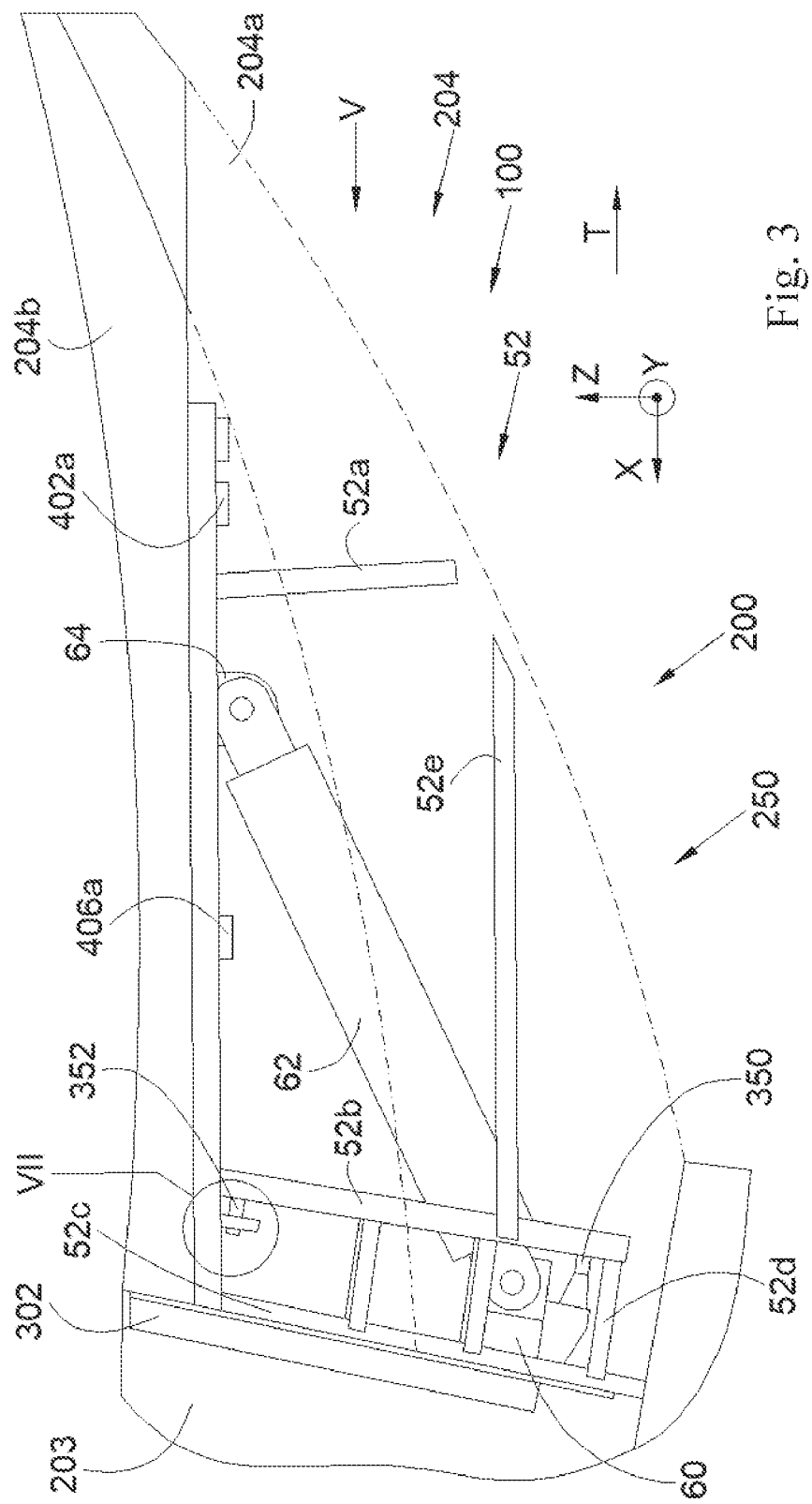
FIG. 3 is a side view of the engine pylon according to the invention, in the advanced and closed position.
Figure 4:
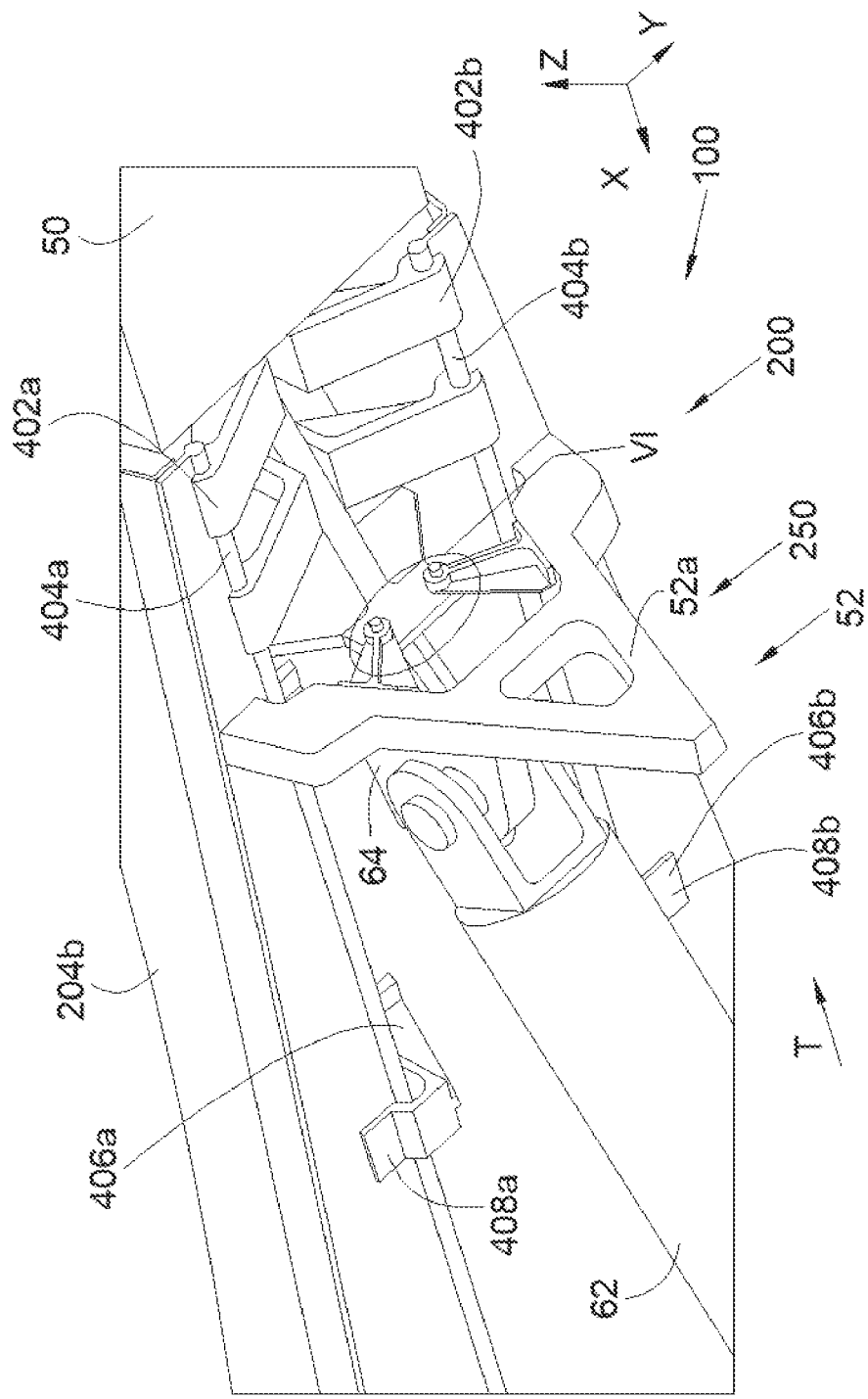
FIG. 4 is a perspective view from below of the engine pylon.

FIG. 3 shows the engine pylon 100 having a slider 52 on which the mobile rear cowl 204a is fastened. In the embodiment of the invention that is presented in FIG. 3, the slider 52 is constituted of vertical ribs 52a-c and horizontal stiffeners 52d-e that are fastened to each other and the mobile rear cowl 204a is fastened around the slider 52 so as to cover it.

FIG. 3 shows the engine pylon 100 with the slider 52 and the mobile rear cowl 204a in the closed and advanced position, the latter being shown as transparent. The slider 52 is arranged so as to pass from the closed and advanced position to an open and retracted position and vice versa, wherein the slider 52 and the mobile rear cowl 204a are moved in translation parallel to a translation direction T generally parallel to the longitudinal direction X.

The engine pylon 100 comprises a rigid structure 302, also called primary structure, which is intended to be fastened between a structure of the engine 14 and a structure of the wing 12, such as, in particular, the front spar of the wing 12 that extends generally in the transverse direction Y. The rigid structure 302 does not constitute an essential element of the invention, and it can take various forms.

The primary structure 302 supports the engine 14 via fastening means (not illustrated) that are disposed generally at the front and at the rear of the primary structure 302 and take, for example, the form of those disclosed in the document US-A-2016/0221682.

The primary structure 302 is embodied here by a rear rib.

The primary structure 302 is fastened to the wing 12, for example, by sets of shackles.

In the embodiment of the invention that is presented here, the engine pylon 100 also has, at the rear of the primary structure 302, a rear clevis 60 as one with the primary structure 302. The primary structure 302 is fastened to the wing 12 inter alia via a rear rod 62 that connects, in use, the rear clevis 60 to an upper clevis 64 of the wing 12.

The rear rod 62 has a first end mounted in an articulated manner on the rear clevis 60 and a second end mounted in an articulated manner on the upper clevis 64, in particular, at the pressure-side panel of the wing 12.

In the embodiment of the invention that is presented here, the cowls 202 and 203 of the front set of cowls 202, 203 are fastened around the primary structure 302, i.e., the primary structure 302 is housed at least in part in the front set of cowls 202, 203.

In the particular embodiment presented here, the rear rod 62 is housed inside the rear cowl 204. Of course, depending on the design of the engine pylon 100, the arrangement may be different.

The front cowl 202 and the intermediate cowl 203 are fastened to the primary structure 302 by any appropriate fastening means such as, for example, support elements, fittings and held by means of threaded means or rivets.

The engine pylon 100 thus has a cowling system 200 that has the front set of cowls 202, 203 and the slider 52 incorporating the mobile rear cowl 204a.

The cowling system 200 also has a displacement system 250 that moves the slider 52 and the mobile rear cowl 204a in translation parallel to the translation direction T from the closed/advanced position, in which the mobile rear cowl 204a is in contact, on its front face, with the intermediate cowl 203 and extends in the continuation of and at the rear of the front set of cowls 202, 203 and, more particularly in this case, the intermediate cowl 203, to the open/retracted position, in which the mobile rear cowl 204a is retracted relative to its advanced position, so as to be moved away, towards the rear, from the front set of cowls 202, 203 and, more particularly in this case, from the intermediate cowl 203, and thus to free up a space between the front set of cowls 202, 203 and the mobile rear cowl 204a so as to allow access to the inside of the engine pylon 100 and to the various systems that are housed therein (not shown in the figures in this file). The mobile rear cowl 204a is thus a mobile cowl and the moving clear of the mobile rear cowl 204a allows easy access compared with the hatches of the prior art. Furthermore, it is not necessary to provide access hatches, thus simplifying the structure relative to the prior art, such as, for example, with a "one-piece" external skin of the cowl, which is made in a single piece and promotes aerodynamic flow, as is shown in FIG. 8 that shows the mobile rear cowl 204a in a single piece. The stopping of the slider 52 and the mobile rear cowl 204a in the open/retracted position is ensured, for example, by any appropriate stopping means, such as, for example, an end-of-travel stop as one with the fixed structure 50 and against which an element of the slider 52 or of the mobile rear cowl 204a comes to abut. In order to allow complete removal of the mobile rear cowl 204a, the stopping means is removable.

The cowling system 200 also has an immobilizing system, such as a lock or latch or a threaded fastener, which can alternately adopt a locked position in which it immobilizes the slider 52 and the mobile rear cowl 204a in the advanced position, and an unlocked position in which it does not immobilize either the slider 52 or the mobile rear cowl 204a, and leaves them free to pass from the advanced position to the retracted position and vice versa. In the unlocked position, the slider 52 and the mobile rear cowl 204a are therefore free to move in translation.

The immobilizing system makes it possible to fasten the slider 52 and/or the mobile rear cowl 204a to a fixed element such as the fixed structure 50, or an element of the engine pylon 100, such as for example, the intermediate cowl 203 or the primary structure 302.

FIGS. 4, 5, 6 and 7 show various views of the displacement system 250, which is generally symmetrical with respect to a vertical median plane XZ of the engine pylon 100.

The displacement system 250 has, on either side of the median plane XZ, at least one guide 402a-b intended to guide the slider 52 parallel to the translation direction T and as one with the fixed structure 50 of the aircraft 10 such as, for example, the structure of the wing 12. In the embodiment of the invention that is presented here, there are two guides 402a-b on each side, i.e., two on the port side and two on the starboard side, and the guides 402a-b are arranged at a rear part of the mobile rear cowl 204a when it is in the closed/advanced position.

The displacement system 250 also has, on either side of the median plane XZ, a sliding element 404a-b as one with the slider 52. There is thus a sliding element 404a on the port side and a sliding element 404b on the starboard side, and each sliding element 404a-b is mounted so as to be able to slide along each guide 402a-b disposed on the same side. The length of each sliding element 404a-b is such that it slides in the guides 402a-b between the closed/advanced position and the open/retracted position.

Each guide 402a-b has a length shorter than the length of the translation undergone by the slider 52, and therefore than the length of the corresponding sliding element 404a-b, in order to limit the forces in the event of a lack of parallelism. The length of each guide 402a-b is, for example, on the order of one third of the length of the translation.

In the embodiment of the invention that is presented here, each sliding element 404a-b has a cylinder parallel to the translation direction T of which the length is at least equal to the length of displacement of the slider 52, and each guide 402a-b has a bore parallel to the translation direction T in which the cylinder is mounted so as to be able to slide. The bore has a slot through which passes the part of the slider 52 ensuring the junction with the cylinder. Of course, any other type of complementary shapes is possible for realizing the sliding connection parallel to the translation direction T.

The cooperation between the guides 402a-b and the sliding elements 404a-b moves the slider 52 and the mobile rear cowl 204a in translation along the translation direction T, between the advanced position and the retracted position and vice versa.

Because the guides 402a-b have shorter lengths than the sliding element 404a-b and are disposed at the rear of the movable rear cowl 204a, the displacement system 250 also has, for each sliding element 404a-b, i.e., on either side of the median plane XZ, a support 406a-b as one with the fixed structure 50 and having a blade 408a-b parallel to the translation direction T and on which a surface of the slider 52 that is parallel to the translation direction T rests. Each support 406a-b is disposed at the front of the guides 402a-b and generally in the middle of the sliding element 404a-b when the slider 52 is in the closed/advanced position.

Each support 406a-b reacts the forces in the Z direction during the displacements of the slider 52 and of the mobile rear cowl 204a at the beginning of the translation from the closed/advanced position. Each support 406a-b also supports the slider 52, avoiding jamming of the latter as a result of the overhang due to the retracted position of the guides 402a-b.

In order to react forces between the slider 52 and the fixed structure 50, the aircraft 10 has a plurality of positioning centering pins, wherein each one is as one with the slider 52 or the fixed structure 50 and, for each positioning centering pin, the fixed structure 50 or the slider 52 has a housing in which the positioning centering pin is housed when the slider 52 is in the advanced position.

In the embodiment of the invention that is presented here, there is one bottom front centering pin 350, two top front centering pins 352 and two rear centering pins 354.

Figure 5:
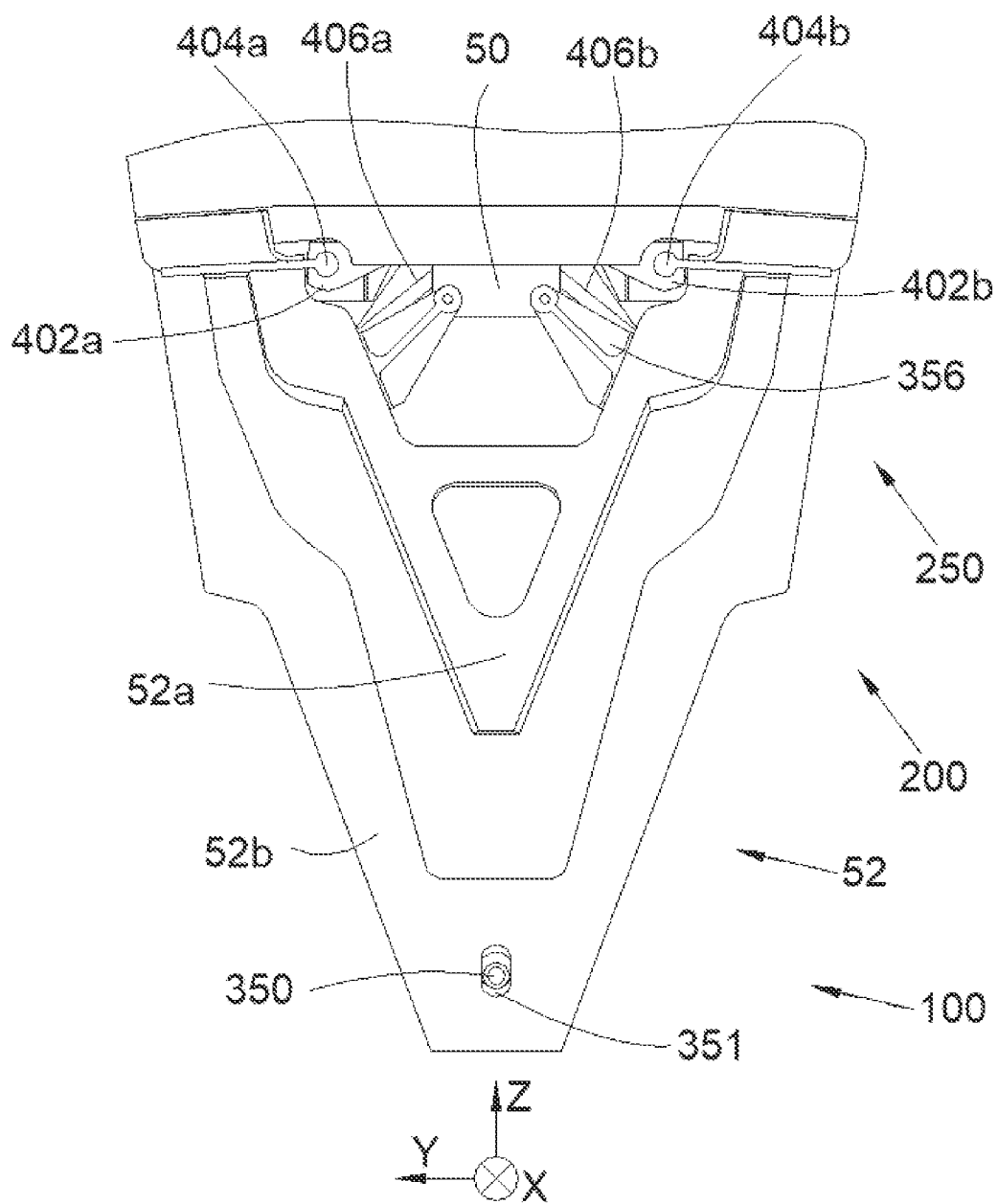
FIG. 5 is a rear view of the engine pylon along the arrow V in FIG. 3.

The bottom front centering pin 350, which is better seen in FIG. 5, is secured to the fixed structure 50, in this case via the rigid structure 302, and it is oriented towards the rear, and the slider 52, in this case a vertical rib 52b, has a first housing 351 in which the bottom front centering pin 350 is housed. The first housing 351 is disposed at the median plane XZ and in the bottom part and at the front of the mobile rear cowl 204a.

The bottom front centering pin 350 thus fits into the first housing 351 when the slider 52 arrives in the advanced position.

The first housing 351 has an oblong shape, of which the major axis is vertical and of which the width along the minor axis is adapted to the diameter of the bottom front centering pin 350 so as to ensure a close sliding fit. Such an arrangement makes it possible to react the transverse forces in the transverse direction Y.

Figure 7:
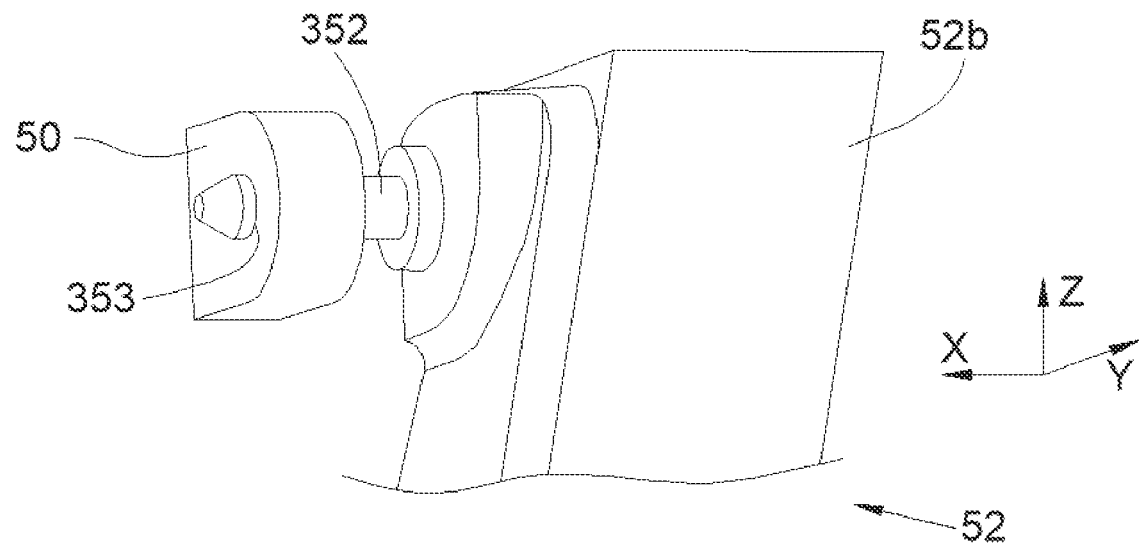
FIG. 7 is a side view of the detail VII in FIG. 3.

The two top front centering pins 352, one of which is better seen in FIG. 7, are secured to the slider 52, in this case via a vertical rib 52b, and they are oriented towards the front and substantially parallel to the longitudinal axis of the sliding elements 404a-b, and the fixed structure 50 has, for each top front centering pin 352, a second housing 353 in which the top front centering pin 352 is housed. The two top front centering pins 352 are disposed on either side of the median plane XZ and in the top part and at the front of the mobile rear cowl 204a.

Each top front centering pin 352 thus fits into the associated second housing 353 when the slider 52 arrives in the advanced position.

Each second housing 353 takes the form of a circular bore integrated in a clevis as one with the fixed structure 50 and adapted to the diameter of the associated top front centering pin 352 so as to ensure a close sliding fit. Such an arrangement makes it possible to react the transverse forces in the transverse direction Y and the vertical forces in the vertical direction Z.

Figure 6:
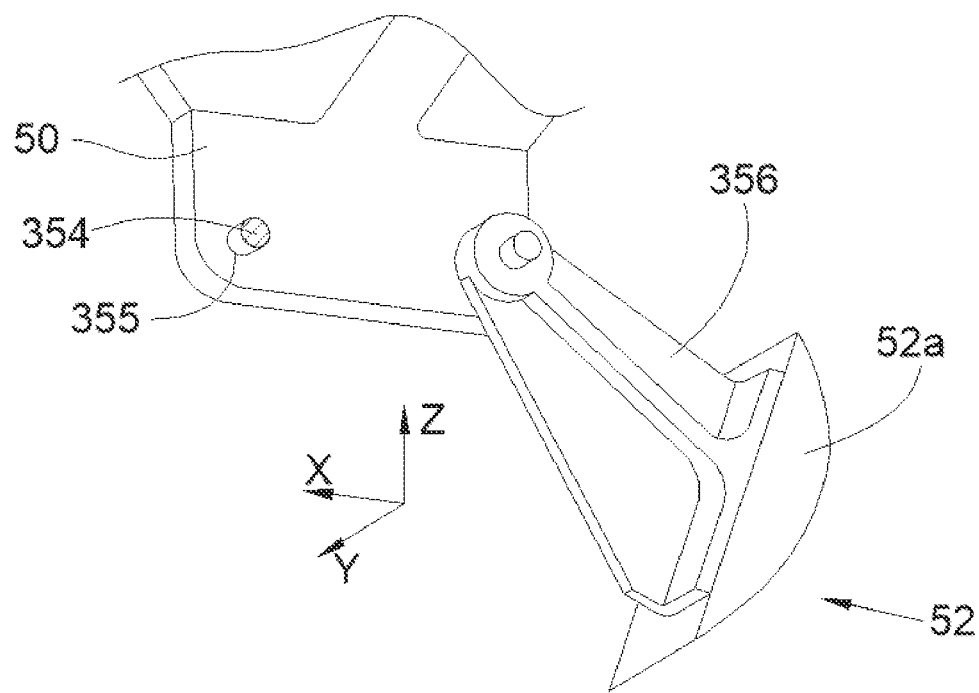
FIG. 6 is a perspective view of the detail VI in FIG. 4.

The two rear centering pins 354, one of which is better seen in FIG. 6, are secured to the slider 52, in this case via, successively, a vertical rib 52a and blades 356 as one with the vertical rib 52a, and they are oriented towards the front, and the fixed structure 50 has, for each rear centering pin 354, a third housing 355 in which the rear centering pin 354 is housed. The two rear centering pins 354 are disposed on either side of the median plane XZ and in the top part of the mobile rear cowl 204a and near the guides 402a-b when the slider 52 is in the advanced position.

For reasons of clarity, the port-side blade 356 has been removed so as to make the third housing 355 and the rear centering pin 354 in the third housing 355 visible.

Each rear centering pin 354 thus fits into the associated third housing 355 when the slider 52 arrives in the advanced position.

Each third housing 355 takes the form of a circular bore integrated in a clevis as one with the structure 50 and adapted to the diameter of the associated rear centering pin 354 so as to ensure a close sliding fit. Such an arrangement makes it possible to react the transverse forces in the transverse direction Y and the vertical forces in the vertical direction Z.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fixed structure,
a wing,
an engine, and
an engine pylon fastened between the wing and the engine, the engine pylon having a primary structure configured to fasten the engine and the wing to each other, and a cowling system having:
a front set of cowls, wherein the cowls are fastened around the primary structure,
a slider bearing a mobile rear cowl disposed in a continuation of and at a rear of the front set of cowls, wherein the slider is able to move in translation parallel to a translation direction from an advanced position, in which the mobile rear cowl is in the continuation of and at the rear of the front set of cowls, to a retracted position, in which the mobile rear cowl is moved away, towards the rear, from the front set of cowls,
a displacement system configured to move said slider and having, on either side of a median plane of the engine pylon, at least one guide as one with the fixed structure at a rear part of the mobile rear cowl in the advanced position, for each at least one guide, a sliding element as one with the slider and mounted so as to be able to slide along each guide disposed on the same side so as to realize a sliding connection, and, for each sliding element, a support as one with the fixed structure and having a blade parallel to the translation direction and on which a surface parallel to the translation direction of the slider rests, wherein each support is disposed at a front of the guides and generally in a middle of the sliding element when the slider is in the advanced position, and
an immobilizing system alternately adopting a locked position in which the immobilizing system immobilizes the slider in the advanced position, and an unlocked position in which it does not immobilize the slider.

2. The aircraft according to claim 1,
wherein each sliding element has a cylinder parallel to the translation direction of which a length is at least equal to a length of displacement of the slider, and
wherein each guide has a bore parallel to the translation direction in which said cylinder is mounted so as to be able to slide.

3. The aircraft according to claim 1,
wherein the fixed structure has a bottom front centering pin,
wherein the slider has a first housing in which said bottom front centering pin is housed when the slider arrives in the advanced position, and
wherein the first housing is disposed at the median plane and in a bottom part and at the front of the mobile rear cowl.

4. The aircraft according to claim 1,
wherein the slider has two top front centering pins disposed on either side of the median plane and in a top part and at the front of the mobile rear cowl, and
wherein the fixed structure has, for each top front centering pin, a second housing in which said top front centering pin is housed when the slider arrives in the advanced position.

5. The aircraft according claim 1,
wherein the slider has two rear centering pins disposed on either side of the median plane and in a top part and near the guides in the advanced position, and
wherein the fixed structure has, for each rear centering pin, a third housing in which said rear centering pin is housed when the slider arrives in the advanced position.

* * * * *